(12) United States Patent
Sundström

(10) Patent No.: US 8,364,803 B2
(45) Date of Patent: Jan. 29, 2013

(54) METHOD, DEVICE, COMPUTER PROGRAM PRODUCT AND SYSTEM FOR REPRESENTING A PARTITION OF N W-BIT INTERVALS ASSOCIATED TO D-BIT DATA IN A DATA COMMUNICATIONS NETWORK

(75) Inventor: Mikael Sundström, Luleå (SE)

(73) Assignee: Oricane AB, Lulea (SE)

( * ) Notice: Subject to any disclaimer, the term of this patent is extended or adjusted under 35 U.S.C. 154(b) by 0 days.

(21) Appl. No.: 12/446,318

(22) PCT Filed: Oct. 19, 2007

(86) PCT No.: PCT/SE2007/050760
§ 371 (c)(1),
(2), (4) Date: Dec. 1, 2010

(87) PCT Pub. No.: WO2008/048185
PCT Pub. Date: Apr. 24, 2008

(65) Prior Publication Data
US 2011/0113129 A1  May 12, 2011

(30) Foreign Application Priority Data

Oct. 20, 2006 (SE) .................................... 0602205-7
Oct. 20, 2006 (SE) .................................... 0602207-3

(51) Int. Cl.
*G06F 15/173* (2006.01)
(52) U.S. Cl. ..................... 709/223; 707/999.1; 712/225; 370/389
(58) Field of Classification Search .................. 709/223; 707/999.1; 712/225; 370/389
See application file for complete search history.

(56) References Cited

U.S. PATENT DOCUMENTS
(Continued)

FOREIGN PATENT DOCUMENTS
WO 0028704 5/2000
WO 03103240 12/2003
(Continued)

OTHER PUBLICATIONS

Sundström et al., "High-Performance Longest Prefix Matching supporting High-Speed Incremental Updates and Guaranteed Compression", 2005, IEEE INFOCOMM, 12 pages.

*Primary Examiner* — Kyung H Shin
(74) *Attorney, Agent, or Firm* — Renner, Otto, Boisselle & Sklar, LLP

(57) ABSTRACT

The present invention relates to a method for routing in a data communications network, said method comprising the steps of: providing in a memory (102), a datagram forwarding data structure (10) provided for indicating where to forward a datagram in said network, which data structure (10) is in the form of a tree comprising at least one leaf (11) and possibly a number of nodes (13) including partial nodes, said data structure (10) having a height (h), corresponding to a number of memory accesses required for looking up a largest stored non-negative integer smaller than or equal to a query key, step 201, reducing worst storage cost by using a technique for reduction of worst case storage cost that are selectable from: partial block tree compaction, virtual blocks, bit push pulling, block aggregation or split block trees, and variations thereof, step 202, updating the layered data structure partially including by using a technique for scheduling maintenance work that are selectable from: vertical segmentation and bucket list maintenance, step 203.

22 Claims, 8 Drawing Sheets

U.S. PATENT DOCUMENTS

| | | |
|---|---|---|
| 6,003,036 A | 12/1999 | Martin |
| 2001/0044876 A1 | 11/2001 | Brown |
| 2003/0063379 A1 | 4/2003 | Fukuyama et al. |
| 2003/0236968 A1* | 12/2003 | Basu et al. ............... 712/225 |
| 2004/0111420 A1* | 6/2004 | Hofstee et al. ............ 707/100 |
| 2004/0230583 A1 | 11/2004 | Testa |
| 2005/0063379 A1* | 3/2005 | Wybenga et al. .......... 370/389 |
| 2011/0113129 A1 | 5/2011 | Sundstrom |

FOREIGN PATENT DOCUMENTS

| | | |
|---|---|---|
| WO | 2004/102856 | 11/2004 |
| WO | 2004102856 | 11/2004 |

\* cited by examiner

Construction of a fixed stride tree

METHOD, DEVICE, COMPUTER PROGRAM PRODUCT AND SYSTEM FOR REPRESENTING A PARTITION OF N W-BIT INTERVALS ASSOCIATED TO D-BIT DATA IN A DATA COMMUNICATIONS NETWORK

This application is a national phase of International Application No. PCT/SE2007/050760 filed Oct. 19, 2007 and published in the English language.

TECHNICAL FIELD

The present invention relates to a method for representing a partition of n w-bit intervals associated to d-bit data in a data communications network. The present invention also relates to a device, system and a computer program product for performing the method.

BACKGROUND

Internet is formed of a plurality of networks connected to each other, wherein each of the constituent networks maintains its identity. Each network supports communication among devices connected to the networks, and the networks in their turn are connected by routers. Thus, Internet can be considered to comprise a mass of routers interconnected by links. Communication among nodes (routers) on Internet takes place using an Internet protocol, commonly known as IP. IP datagrams (data packets) are transmitted over links from one router to the next one on their ways towards the final destinations. In each router a forwarding decision is performed on incoming datagrams to determine the datagrams next-hop router.

A routing or forwarding decision is normally performed by a lookup procedure in a forwarding data structure such as a routing table. Thus, IP routers do a routing lookup in the routing table to obtain next-hop information about where to forward the IP datagrams on their path toward their destinations. A routing lookup operation on an incoming datagram requires the router to find the most specific path for the datagram. This means that the router has to solve the so-called longest prefix matching problem which is the problem of finding the next-hop information (or index) associated with the longest address prefix matching the incoming datagrams destination address in a set of arbitrary length (for instance between 0 and the address length) prefixes constituting the routing table.

To speed up the forwarding decisions, many IP router designs of today use a caching technique, wherein the most recently or most frequently looked up destination addresses and the corresponding routing lookup results are kept in a route cache. This method works quite well for routers near the edges of the network, i.e. so called small office and home office (SOHO) routers having small routing tables, low traffic loads, and high locality of accesses in the routing table.

Another method of speeding up the routers is to exploit the fact that the frequency of routing table updates, resulting from topology changes in the network etc., is extremely low compared to the frequency of routing lookups. This makes it feasible to store the relevant information from the routing table in a more efficient so-called "forwarding table" optimized for supporting fast lookups.

In this context, a forwarding table is an efficient representation of a routing table and a routing table is a dynamic set of address prefixes. Each prefix is associated with next hop information, i.e. information about how to forward an outgoing packet and the rules of the game state that the next-hop information associated with the longest matching prefix of the destination address (of the packet) must be used. When changes to the routing table occur, the forwarding table is partially or completely rebuilt.

An example of a forwarding data structure is a so-called "static block tree", which is a comparison based data structure for representing w-bit non-negative integers with d-bit data and supporting extended search in time proportional to the logarithm with base B, where B−1 is the number of integers that can stored in one memory block, of the number of integers stored. Typically, it is a static data structure which supports efficient extended search with minimum storage overhead. The static block tree data structure has previously been described in the Swedish patent 0200153-5, which refers to a method and system for fast IP routing lookup using forwarding tables with guaranteed compression ratio and lookup performance where it is referred to as a Dynamic Layered Tree and also in M. Sundström and Lars-Åke Larzon, *High-Performance Longest Prefix Matching supporting High-Speed Incremental Updates and Guaranteed Compression*, IEEE INFOCOMM, Miami Fla., USA, 2005.

A basic block tree, for instance in the form of a dynamic layered tree, consists of at least one leaf and possibly a number of nodes if the height is larger than one. The height corresponds to the number of memory accesses required for looking up the largest stored non-negative integer smaller than or equal to a query key. This kind of lookup operation is referred to as extended search.

The problem solved by a basic block tree is to represent a partition, of a totally ordered universe U, consisting of n basic intervals. Since U is known, also minU and maxU are known. Therefore, it is sufficient to represent n−1 interval boundaries where each interval boundary is represented by an element which is a w-bit non-negative integer. The w-bit non-negative integer is referred to as the key and the corresponding d-bit data field as the data. In one memory block, we can store B elements and thus represent B+1 intervals. We call the resulting data structure a basic block tree of height 1. Each basic interval constitutes a subset of U. For each subset, we can recursively represent a partition consisting of B+1 intervals by using one additional memory block. By combining the original partition of U with the B+1 sub-partitions, we obtain a block tree of height 2 representing $(B+1)^2$ basic intervals. Assuming that pointers to sub-structures can be encoded implicitly, it is possibly to recursively construct a block tree of arbitrary height t for representing up to $(B+1)^t$ basic intervals.

A block tree of height t that represents exactly $(B+1)^t$ intervals is said to be complete. Otherwise it is partial. The need for pointers is avoided by storing a block tree in a consecutive array of memory blocks. To store a block tree of height t, first the root block is stored in the first location. This is followed by up to B+1 recursively stored complete block trees of height t−1 and possibly one recursively stored partial block tree of height t−1. No pointers are needed since the size s(t−1) of a complete block tree of height t−1 can be computed in advance. The root of sub-tree i is located i·s(t−1) memory blocks beyond the root block (assuming that the first sub-tree has index zero).

Typically, there are two major problems with basic block trees. The first problem is related to worst case storage cost. More precisely, the worst case amortized number of bits required for storing n keys and their corresponding data may be considerably larger than n·(w+d) in the worst case resulting in a worst case cost per key of much more than w+d bits which is optimal (at least in a sense). The second problem is related to incremental updates. A basic block tree is essentially static which means that the whole data structure must be rebuilt from scratch when a new key and data is inserted or deleted. As a result, the cost for updates is too high, i.e. at least in some applications, it takes too much time and computation, in particular if the block tree is large.

Now, consider yet another general problem of designing a data structure for storing and looking up keys from a bounded universe. If we completely disregard the fact that the universe is bounded, we can simply use a comparison-based data structure such as a binary tree. We can express the efficiency of the data structure in terms of costs for storage and lookups. For a binary tree, the amount of storage used is proportional to the number of keys whereas the time for lookup is proportional to lg n, where lg denotes the logarithm with base 2.

As an alternative approach we could use a digital data structure such as a trie to exploit the bounded universe. An example of a trie is a fixed stride trie, which is a data structure for representing w-bit keys in t levels where level i consist of nodes represented by arrays of pointers of size $2^{k[i]}$ (2 to the power of k[i]). The numbers k[i] are called strides and a trie where each k[i] equals 1 is refereed to as a binary trie. Each pointer either refers directly to a piece of data if there is only one matching key or a node at the next (lower) level. We number the levels from t, t−1, . . . , 1 where t is the topmost level. At the topmost level, the k[t] most significant bits of the query key are used to index into the array of pointers. If the pointer retrieved refers to a sub-trie, the w−k[t] least significant bits of the query key are used recursively to complete the lookup. Fixed stride tries support extended search.

Both trees and tries are defined recursively and consists of nodes and leaves, where a query key is compared to a piece of information stored in each node and the outcome determines in which sub-structure to continue the search. Assume that the universe consists of the set of w-bit non-negative integers and compare a binary tree node with a binary trie node. The tree node contains a key which effectively partitions the universe into the left sub-universe, the right sub-universe, and the key itself. In contrast, the trie node specifies an index of a certain bit to be inspected and effectively partitions the universe into the 0-subuniverse and the 1-subuniverse consisting of all keys where the inspected bit is 0 and 1 respectively. Since the size of the universe is reduced by a factor of 2 by each trie node it follows that the maximum height as well as the worst case cost for lookup in a trie is proportional to w.

When comparing block trees with tries, for example t-level fixed stride tries, we observe a third problem with block trees namely the lookup cost. Whereas such a trie has a bounded lookup cost of t steps (or memory accesses), independently of the number of intervals, the lookup cost in a block tree grows logarithmically with the number of intervals. Another key aspect of the performance is the worst case storage costs per interval. Whereas the total storage cost in a block tree grows linearly with the number of intervals and could potentially be reduced to only w+d bits per interval using the present invention, there is an explosive growth of the worst case storage cost of a fixed stride trie if t is considerably less that w, which is typically the case since it would not make any sense otherwise to bound the lookup cost.

SUMMARY OF THE INVENTION

The present invention aims to solve the problems discussed above such as to reduce the worst case storage cost to the optimal w+d bits/key and the problem with expensive incremental updates as well as guarantee a bounded worst case lookup cost independently of the number of intervals.

According to a first aspect of the present invention, this is provided by a method of the kind defined in the introductory portion of the description and having the characterizing features of claim 1. In the present invention the method comprises the steps of:

providing in a storage (memory), a datagram forwarding data structure provided for indicating where to forward a datagram in said network, which data structure comprises at least one leaf and possibly a number of nodes including partial nodes, said data structure having a height, corresponding to a number of memory accesses required for lookup in an arbitrary partition comprising n intervals, reducing worst storage cost by using a technique for reduction of worst case storage cost that are selectable from: partial block tree compaction, virtual blocks, bit push pulling, block aggregation or split block trees, and variations thereof, updating the layered data structure partially by using a technique for scheduling maintenance work that are selectable from: vertical segmentation and bucket list maintenance.

While the illustrations and the description includes static block trees as examples and embodiments thereof, the invention is not limited to a static data structure in the form of a block tree per se, but also comprises other types of static data structures such as so-called "fixed stride tries" or the like.

Herein, a data structure is "static", if updates are accomplished by complete reconstruction, i.e. by building a new data structure from scratch.

Herein, the expression "lookup in an arbitrary partition comprising n intervals", also referred to as "1-dimensional classification", could logically be briefly explained by the following.

(1) "longest prefix matching (i.e. routing lookup) can be reduced to "most narrow interval matching"
(2) "most narrow interval matching" can be reduced to "first interval matching"
(3) "first interval matching" can be reduced to "only interval matching" (i.e. lookup in an arbitrary partition comprising n intervals)

This means that any method for solving (3) can also be used to solve (2) and any method for solving (2) can also be used to solve (1). Another way of explaining this is that (2) is a more general problem than (1) whereas (3) is the most general problem of them all, Note that all methods described in the present invention support "extended search" thus solving (3) (as well as (2) and (1)).

The above method is characterized in that it comprises a technique for reducing worst storage cost, and a technique for scheduling maintenance work that are selectable from: vertical segmentation and bucket list maintenance.

Thus, the method solves the problems discussed above such as to reduce the worst case storage cost to the optimal w+d bits/key and the problem with expensive incremental updates.

According to a second aspect of the present invention, this is provided by a device of the kind defined in the introductory portion of the description and having the characterizing features of claim 9. The device is characterized in that it comprises means for providing in a storage, a datagram forwarding data structure provided for indicating where to forward a datagram in said network. The data structure comprises at least one leaf and possibly a number of nodes including partial nodes, and has a height corresponding to a number of memory accesses required for lookup in an arbitrary partition comprising n intervals. The device further comprises means for reducing worst storage cost by using a technique for reduction of worst case storage cost that are selectable from: partial block tree compaction, virtual blocks, bit push pulling, block aggregation or split block trees, and variations thereof. The device further comprises means for updating the layered data structure partially by using a technique for scheduling maintenance work that are selectable from: vertical segmentation and bucket list maintenance.

According to a third aspect of the present invention a computer program product is provided, having computer program code means to make a computer execute the above method when the program is run on a computer. The computer program product is directly loadable into the internal memory of a digital computer, characterized in that said product comprises software code means for performing the claimed steps. The computer program product comprises a computer readable medium, characterized in that, on said medium it is stored computer program code means, when it is loaded on a computer, to make the computer performing the claimed steps.

It is appreciated that the computer program product is adapted to perform embodiments relating to the above described method, as is apparent from the attached set of dependent system claims.

According to a fourth aspect of the present invention a system is provided, comprising a device of the kind defined in the introductory portion of the description and having the characterizing features of claim 13.

Thus, the concept underlying the present invention is to provide an inventive mix of static and dynamic data structures. According to a principal aspect of the present invention, this is provided by combining three techniques: static block tree, bucket list maintenance and vertical segmentation in the resulting block trees thereby obtaining a storage efficient dynamic block tree with lower (bounded) cost for incremental updates.

The benefits of the invention described above is that it can be combined to first construct a static block tree where the worst case amortized storage cost of w+d bits per interval irrespectively of the relation between w, d, and b is reduced. This means that the exact worst case memory requirements for a data structure with n entries (key+data) is known in advance which, in turn, means that it is considerably easier to design a system and to guarantee robust and stable operation at all times. By using the invention, it is also possible to implement efficient incremental updates thereby obtaining a dynamic block tree.

According to another aspect of the present invention, clearly, it is easier to design an efficient data structure for a smaller value of w. It would make the nodes of a tree smaller, and also result in a faster trie lookup. We have also observed that a comparison-based approach is more efficient if the number of keys is small whereas a straightforward trie approach is insensitive to the number of keys. Thus, for a large number of keys, we can use larger trie nodes and amortize the costs for storage. In particular, we can use a $2^k$-ary trie node to partition the universe into $2^k$ sub-universes for some k>1. Principally, this observation forms the basis for the compression technique of the present invention.

Furthermore, since the cost for lookup in a block tree is proportional to the logarithm with base_B+1, where B is the number of keys that can be stored in a memory block, of the total number of keys in the block tree, the efficiency of block tree structures is increased as keys become smaller when traversing each trie node. Indeed, the core functionality of a multi-bit trie is to reduce the size of the remaining key as the trie is traversed downwards. Initially, the universe consist of $2^w$ possible keys. After traversing a trie node with stride k, the size of the key is reduced to w−k thus reducing the size of each sub-universe to $2^{(w-k)}$ possible keys. The hardness of the problem is reduced as the size of the keys are reduced which means that a trie successively reduces the problem until the keys become small enough to make the remaining lookup problem trivial.

According to another aspect of the present invention, this is provided by a method of the kind defined in the introductory portion of the description and having the characterizing features of claim 1. The method comprises the steps of:
providing in a storage, a datagram forwarding data structure provided for indicating where to forward a datagram in said network, which data structure is in the form of an comparison based implicit tree structure comprising at least one leaf and possibly a number of nodes,
providing a fixed stride trie structure, in which the leafs comprise a forest of implicit tree structures,
combining said comparison based implicit tree structure and said fixed stride trie structure to a hybrid structure.

According to another aspect of the present invention, this is provided by a classifier device of the kind defined in the introductory portion of the description and having the characterizing features of claim 8. The classifier device comprises
a storage for storing a datagram forwarding data structure provided for indicating where to forward a datagram in a network, which data structure comprises a tree structure comprising at least one leaf and possibly a number of nodes, said data structure having a height, corresponding to a number of memory accesses required for looking up a largest stored non-negative integer smaller than or equal to a query key, wherein said device comprises:
a fixed or k-stride stride trie structure, in which the leafs comprise a forest of implicit tree structures,
means for combining said comparison based implicit tree structure and said trie structure to a hybrid structure.

According to another aspect of the present invention a computer program product is provided having computer program code means to make a computer execute the above method when the program is run on a computer.

According to another aspect of the present invention

It is appreciated that the computer program product is adapted to perform embodiments relating to the above described method, as is apparent from the attached set of dependent system claims.

In this way, there is provided a method, a classifier device a computer program product and a system providing a data structure that reduces the size of the universe and, at the same time is comparison based. This structure is in the following referred to as a "static hybrid tree" (abbr. SHT), which is a Static t level data structure for representing w-bit keys with d-bit data using approximately w+d bits per key in the worst case for t proportional to the square root of w. Advantages with this structure is that this structure supports extended search. The invention is achieved by combining fixed stride tries (abbr. FST) with static block trees abbr. (SBT) according to a framework that involves amortized algorithm analysis, to achieve maximum compression, of which the latter can be automated.

An alternate embodiment of the present invention comprises a Static 1-dimensional classifier a k a single field classification (SFC).

The present invention provides a method for classification of exactly one address field or port field in a datagram (packet in the Internet). For IP version 4 each address field consist of 32 bits and for IP version 6 each address field consists of 128 bits whereas each port field consists of k16 bits. The keys and associated data are stored in a static hybrid tree.

A problem solved by this invention is to achieve a data structure for representing a partition of w-bit intervals where the lookup cost is bounded, as with a fixed stride trie, and where the storage cost at the same time is linear in the number of intervals, as with a block tree.

The invention finds application for routing, forensic networking, fire-walling, qos-classification, traffic shaping, intrusion detection, IPSEC, MPLS, etc and as component in technologies to solve any one of the problems mentioned.

Additional features and advantages of the present invention are disclosed by the appended dependent claims.

BRIEF DESCRIPTION OF THE DRAWINGS

To further explain the invention embodiments chosen as examples will now be described in greater details with reference to the drawings of which:

FIG. 3a-d illustrates bit push-pulling technique;

DESCRIPTION OF EMBODIMENTS OF THE INVENTION

Figure 1A:
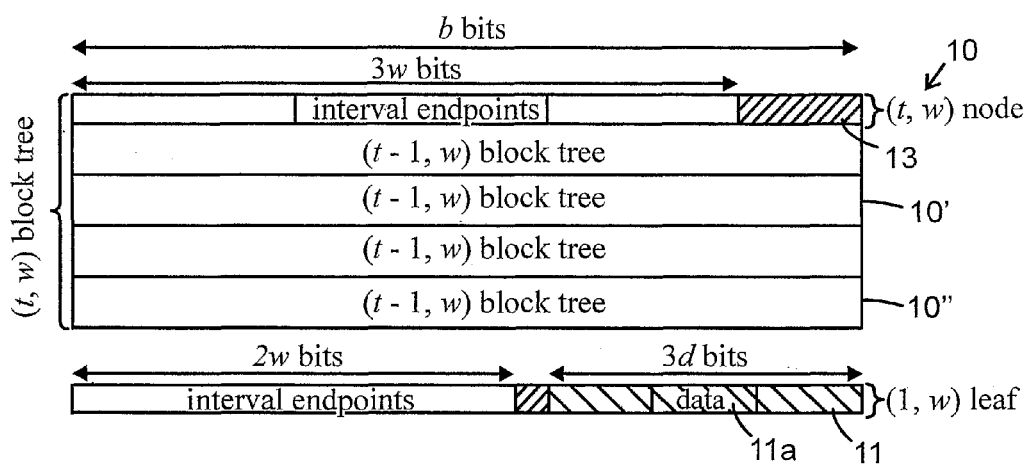
FIG. 1a illustrates a possible organization of a basic block tree.

Before a detailed discussion of embodiments of the invention is given, the general background of the present invention related to a first part of the present invention, related to how to provide a dynamic block tree (DBT), shall be discussed in more detail with reference to FIG. 1a-b, (and c) to ease the understanding of the principles of the invention, followed by a detailed description of an embodiment of the present invention.

Initially, block trees were introduced to implement an IPv4 forwarding table. A block tree, or more precisely a (t, w) block tree is an O(n) space implicit tree structure for representing a partition consisting of intervals of a set of w-bit non-negative integers. It supports search operations in at most t memory accesses for a limited number of intervals.

Figure 1B:
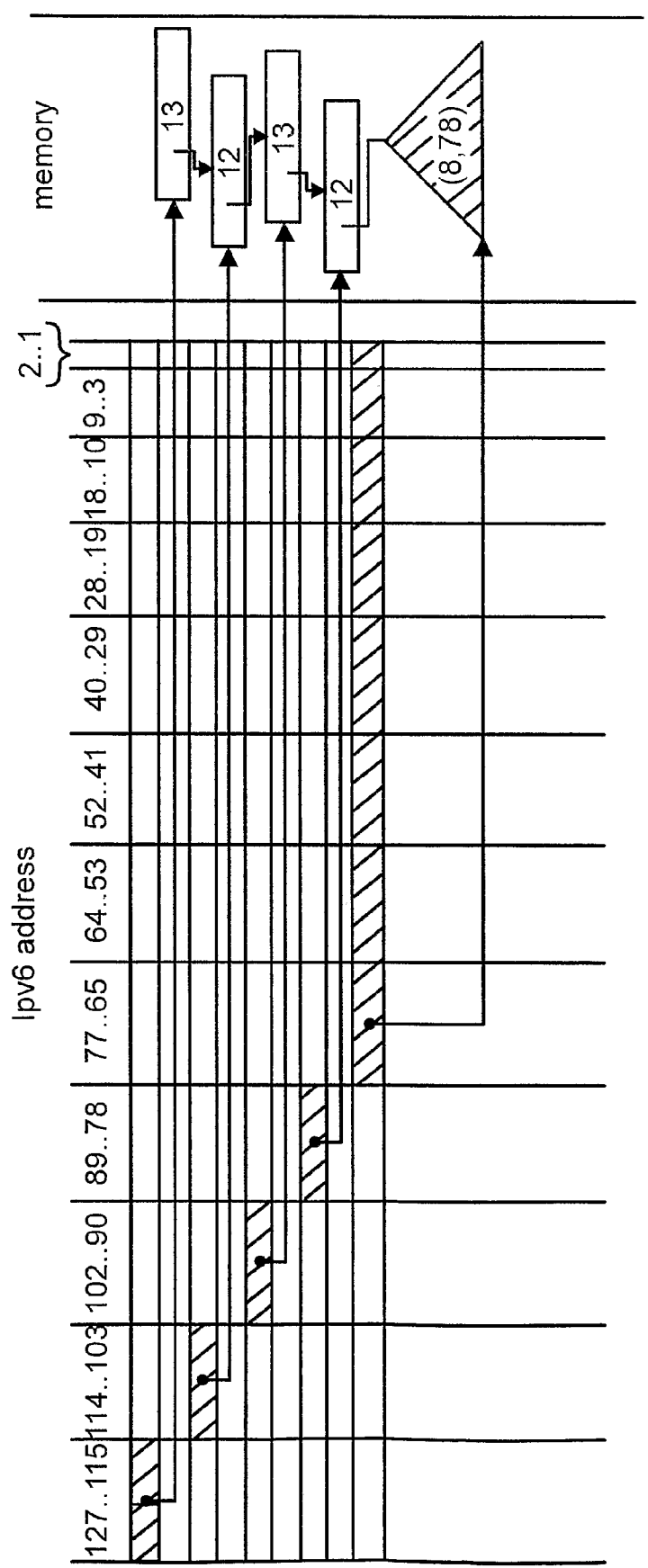
FIG. 1b illustrates an example of a lookup procedure.
Figure 1C:
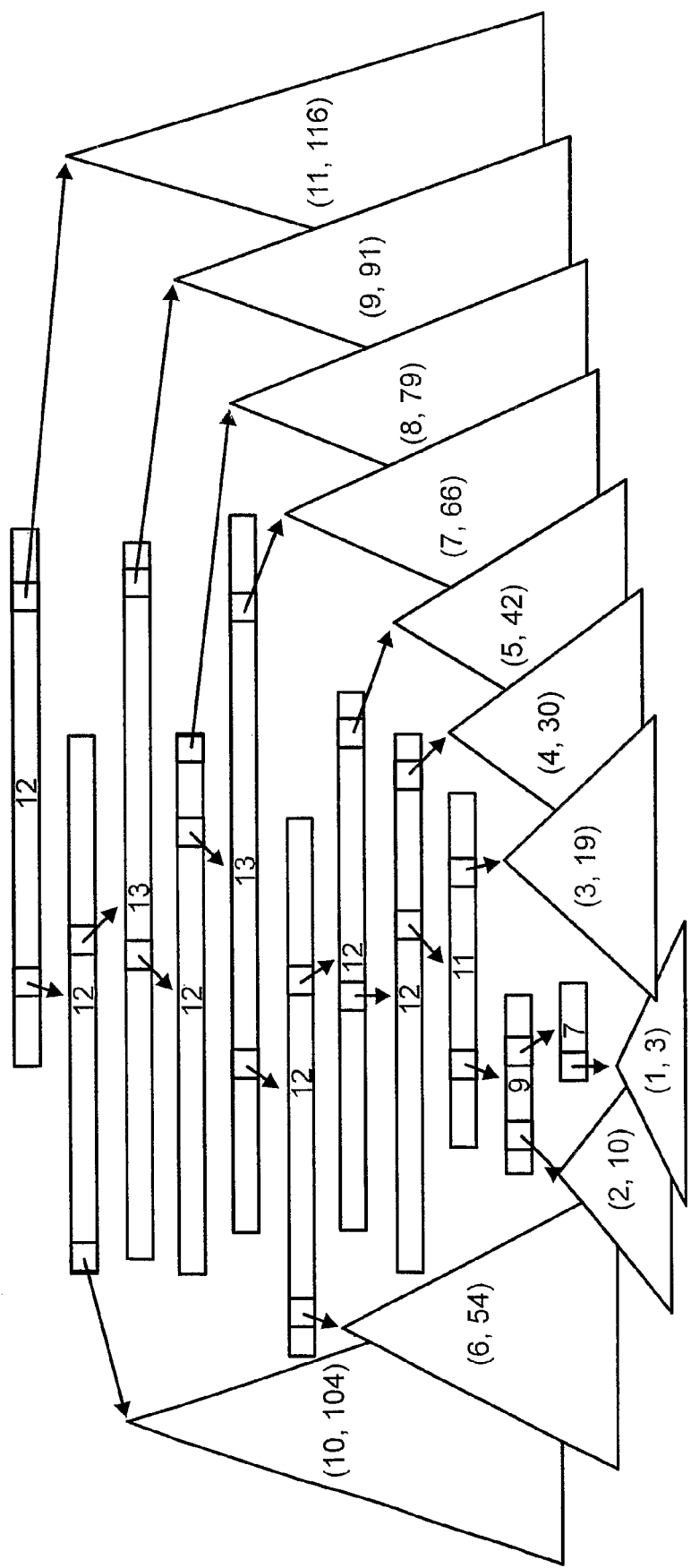
FIG. 1c illustrates a stride.

FIG. 1b illustrates an example of lookup, and FIG. 1c illustrates a hybrid data structure, for w=128 and d=16, consisting of a hierarchy of strides (rectangular blocks) and block trees (triangles) according to the configuration 12-12-13-12-13-12-12-12-11-9-7"

A basic block tree 10 is characterized by two parameters: the height, or worst case lookup, cost t and the number of bits b that can be stored in a memory block. To distinguish between block trees with different parameters the resulting structure is typically called "a (t, b)-block tree". Sometimes the parameter t is referred to as the number of levels or the height of the block tree. For example, a complete (1, b)-block tree consists of a leaf and a complete (t, b)-block tree consists of a node followed by b+1 complete (t−1, b)-block trees.

As already disclosed, a basic block tree consists of at least one leaf and possibly a number of nodes if the height t is larger than one. The height t corresponds to the number of memory accesses required for looking up the largest stored non-negative integer smaller than or equal to the query key.

As mentioned above, a basic block tree 10 is either complete or partial. By a complete basic block tree 10 we mean a block tree where the number of integers stored equals the maximum possible number for that particular height t. That is, a complete basic block tree 10 (or 10', or 10") of height 1 consists of a full leaf 11 and a complete basic block tree of height t larger than 1 consists of a full node 13 and a number of complete basic block trees 10 of height t−1. Each leaf 11 and node 13 is stored in a b-bit memory block. By a full leaf we mean a leaf 11 containing n data fields 11a and n−1 integers where n is the largest integer satisfying $n \cdot D+(n-1) \cdot W < b+1$. By a full node we mean a node 13 containing n integers where n is the largest integer satisfying $n \cdot W < b+1$. Integers stored in each leaf 11 and node 13 are distinct and stored in sorted order to facilitate efficient search. The number of integers stored in a node 13 is denoted by B. FIG. 1b illustrates an example of a lookup procedure, and FIG. 1c a stride.

Figure 2:
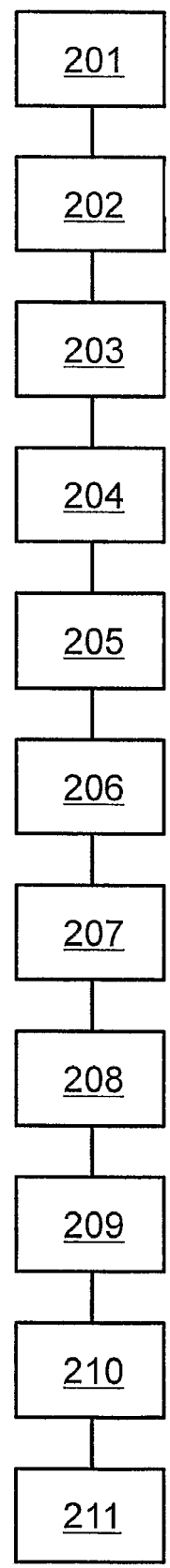
FIG. 2 is a flow-chart showing the method according to an embodiment of the present invention.
Figures 3, 4:
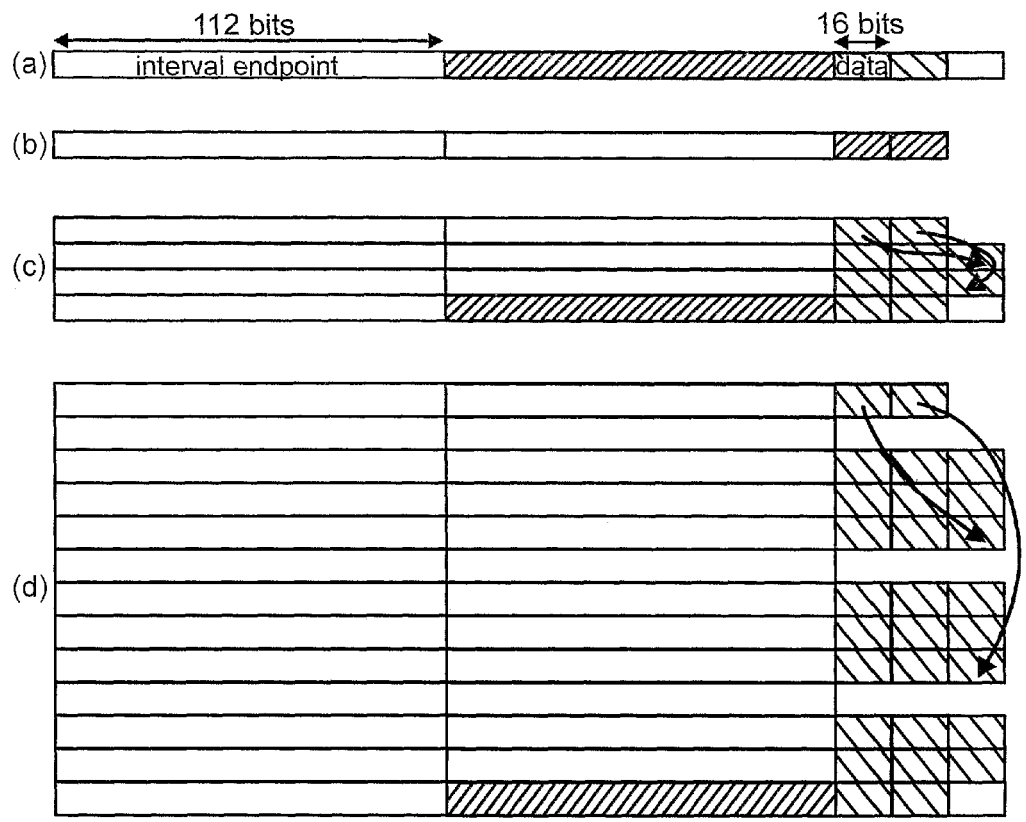
FIG. 4 illustrates a layout of a 1024-bit super leaf.
Figure 6:
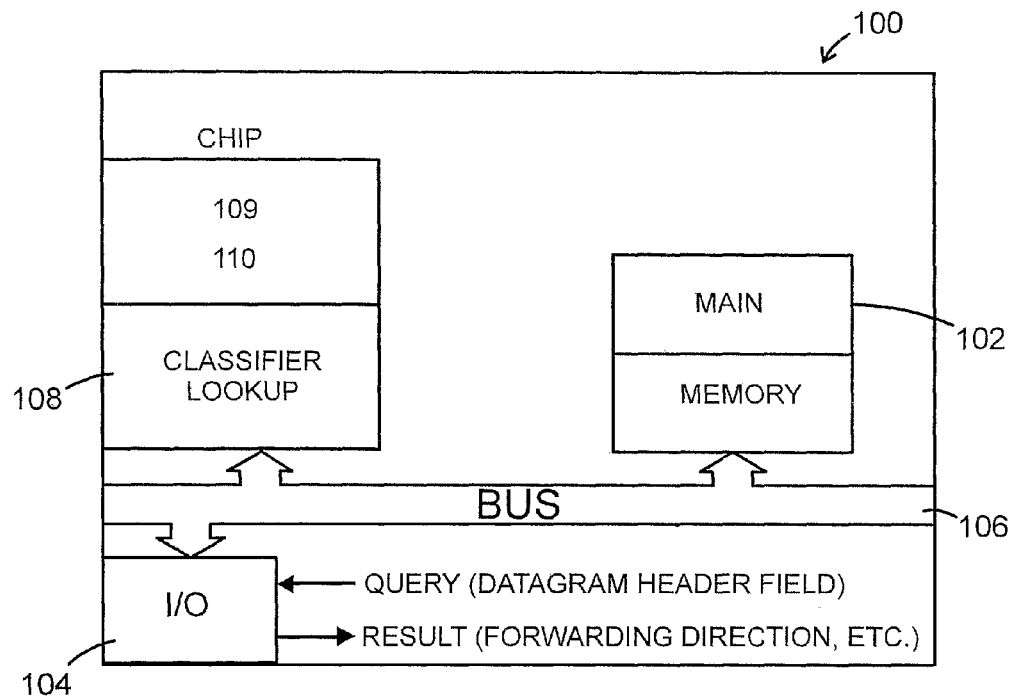
FIG. 6 illustrates a schematic block diagram of a (hardware) device according to an embodiment of the present invention.
Figure 7:
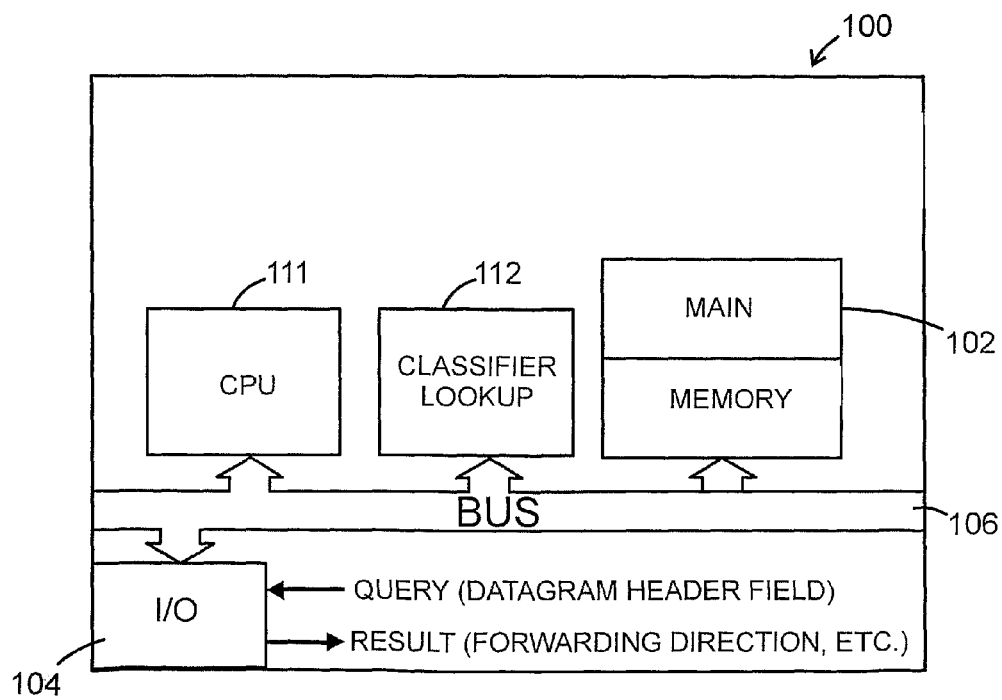
FIG. 7 illustrates a schematic block diagram of a software solution according to an embodiment of the present invention.

Embodiments of the present invention will now be described with reference to FIGS. 1a, and 2 (and FIG. 6), of which FIG. 2 illustrates the method steps and FIG. 6 illustrates a classifier device according to an embodiment of the invention configured in hardware.

In a first step 201, there is provided in a storage comprising a main memory of a device for representing a partition of n w-bit intervals associated to d-bit data in a data communications network, a datagram forwarding data structure 10 provided for indicating where to forward a datagram in a data communications network (not shown). The data structure 10 is in the form of a tree comprising at least one leaf and possibly a number of nodes including partial nodes. As illustrated in FIG. 1a, the data structure 10 has a height h, corresponding to a number of memory accesses required for looking up a largest stored non-negative integer smaller than or equal to a query key. In a second step, 202 worst storage cost is reduced by using a technique for reduction of worst case storage cost that are selectable from: partial block tree compaction, virtual blocks, bit push pulling, block aggregation or split block trees, and variations thereof. In a third step 203, the layered data structure is updated partially by using a technique for scheduling maintenance work that are selectable from: vertical segmentation and bucket list maintenance.

In another embodiment of the present invention, the technique for reduction of worst case storage cost comprises partial block tree compaction, the latter including the sub-steps of:

storing multiple partial nodes in the same memory block, step 204 storing partial nodes across two memory blocks, step 205 moving partial nodes to under utilized memory blocks higher up in the tree, step 206.

In another embodiment of the present invention, the technique for reduction of worst case storage cost comprises the sub-steps of:

performing compaction at each level, starting at level t, and completing the same when the partial node at level 1 has been compacted, wherein mi is the number of additional elements that can be stored in the partially utilized block at level i and j the level of the next partial node to be compacted, wherein initially, before compaction begins, mi=B−ni for all i=1 . . . t and j=t−1, wherein compaction at level i is performed by repeatedly moving the next partial node to the current memory block, wherein this is repeated as long as nj≦mi, wherein for each node moved, mi is decreased by nj followed by decreasing j by 1, wherein mj has to be decreased to B before decreasing j since moving the node at level j effectively frees the whole block at level j, wherein if mi>0 when compaction halts, some space is available, in the current block, for some of the elements from the next partial node but not for the whole node, wherein the first mi elements from the next partial node are moved to the current memory block, which becomes full, and the last nj−mi elements are moved to the beginning of the next memory block, i.e. the block at level i−1, followed by decreasing mi−1 by nj−mi and increasing mj to B, wherein i is increased by 1 and compaction continues at the next level, wherein the final compacted representation is obtained by repeatedly moving the rightmost node to the leftmost free block until all free blocks are occupied, step 207.

In another embodiment of the present invention, the method comprises the step of providing virtual memory blocks with custom sizes bleaf and bnode for leaves and nodes respectively such that 100% block utilization is achieved, step 208.

In another embodiment of the present invention, the method further comprises the step of emulating memory blocks with some other size than b in order to increase block utilization, wherein nleaf=n (1, w, b, d) and nnode=floor(b/w), in each leaf and node bleaf=b−(nleaf·(d+w)−w) and bnode=b−nnode·w unused bits respectively. If bnode=nnode·((w+d)−bleaf), each leaf below a parent node at level 2, except the last leaf, can be extended to b+(w+d)−bleaf bits by storing (w+d)−bleaf bits in the parent node, step 209.

In another embodiment of the present invention, the method further comprises the step of spending all memory accesses, up to the worst case update cost budget, on each update to achieve preventive service of the data structure and thus postpone the first too expensive update as much as possible, step 210.

In another embodiment of the present invention, longest prefix matching (i.e. routing lookup) is reduced to most narrow interval matching, and most narrow interval matching is reduced to first interval matching.

In another embodiment of the present invention, the method further comprises the step of amortization of cost, step 211.

All these method steps related to different embodiments of the present invention will be still further described below, but first is referred to FIG. 6, which is an illustration of a block schematic of a classifier device 100 for performing the method, according to an embodiment of the present invention. The classifier device 100 is implemented in hardware and could be referred to as a classifier. The hard-ware implemented device 100 comprises an input/output unit 104 for transmission of data signals comprising datagrams to or from a source or destination such as a router or the like (not shown). This input/output unit 104 could be of any conventional type including a cordless gate way/switch having input/output elements for receiving and transmitting video, audio and data signals. Data input is schematically illustrated as "query" of one or more data header field(s), and data output as a result such as forwarding direction, policy to apply or the like. Arranged to communicate with this input/output unit 104 there is provided a system bus 106 connected to a control system 108 for instance including a custom classification accelerator chip arranged to process the data signals. The chip provides, or includes, means for reducing worst storage cost by using a technique for reduction of worst case storage cost that are selectable from: partial block tree compaction, virtual blocks, bit push pulling, block aggregation or split block trees, and variations thereof, and means for updating the layered data structure partially including by using a technique for scheduling maintenance work that are selectable from: vertical segmentation and bucket list maintenance. Typically, the chip 108 could be configured as comprising classifier lookup structure and classifier lookup, typically hardwired.

In an alternative embodiment of the present invention, the classifier device 100 is implemented in software instead. To ease understanding, same reference numerals as already have been used in relation to FIG. 6 will be used as far as possible.

Typically, the control system 108 comprises a processor 111 connected to a fast computer memory 112 with a system bus 106, in which memory 112 reside computer-executable instructions 116 for execution; the processor 111 being operative to execute the computer-executable instructions 116 to:

providing in a storage 102, herein typically the main-memory, a datagram forwarding data structure provided for indicating where to forward a datagram in said network, which data structure is in the form of a block tree, or fixed stride trie, comprising at least one leaf and possibly a number of nodes including partial nodes, said data structure having a height, corresponding to a number of memory accesses required for lookup in an arbitrary partition comprising n intervals;

reducing worst storage cost by using a technique for reduction of worst case storage cost that are selectable from: partial block tree compaction, virtual blocks, bit push pulling, block aggregation or split block trees, and variations thereof;

updating the layered data structure partially by using a technique for scheduling maintenance work that are selectable from: vertical segmentation and bucket list maintenance.

The second step 202 will now be described in more detail below, whereby possible techniques for reduction of worst storage cost are described. The techniques could be used separately or in any combination without departing from the invention.

Partial Block Tree Compaction

In a complete block tree, all memory blocks are fully utilized in the sense that no additional keys can be stored in each node and no additional pairs of keys and data can be stored in the leaves. The number of memory blocks required for storing the intervals is not affected by the construction of the block tree which merely rearranges the interval endpoints. The resulting data structure is therefore referred to as implicit as the structure is implicitly stored in the ordering between the elements. However, this is not true for a partial block tree. In the worst case, there will be t memory blocks which contain only one interval endpoints. If B>1 this means that the total storage overhead resulting from under utilized memory blocks can be as much as t·(B−1) elements. The resulting data structure can thus not be said to be implicit. If, for some reason, the height must be hard coded irrespectively of n the overhead increases to tB for a degenerated t-level block tree containing zero intervals. To make the whole data structure implicit, partial nodes must be stored more efficiently.

According to an embodiment of the present invention, this could be provided by means of a technique herein called "partial block tree compaction", step 202, which can be used to reduce the storage cost for any partial (t, B)-block tree to the same cost as a corresponding complete block tree. This is achieved by combining three sub-methods:

Multiple partial nodes are stored in the same memory block.

Partial nodes are stored across two memory blocks.

Partial nodes are moved to under utilized memory blocks higher up in the tree.

There is at most one partial node at each level. Furthermore, if there is a partial node at a certain level it must be the rightmost node at that level. Let ni be the number of elements in the rightmost node at level i. The sequence n1, n2, . . . , nt is completely determined by n, t, and B. Compaction is performed at each level, starting at level t, and completed when the partial node at level 1 has been compacted. Let mi be the number of additional elements that can be stored in the partially utilized block at level i and j be the level of the next partial node to be compacted. Initially, i.e. before compaction begins, mi=B−ni for all i=1 . . . t and j=t−1. Compaction at level i is performed by repeatedly moving the next partial node to the current memory block. This is repeated as long as nj≦mi. For each node moved, mi is decreased by nj followed by decreasing j by 1. Note that we also have to increase mj to B before decreasing j since moving the node at level j effectively frees the whole block at level j. If mi>0 when compaction halts, some space is available, in the current block, for some of the elements from the next partial node but not for the whole node. Then, the first mi elements from the next partial node are moved to the current memory block, which becomes full, and the last nj−mi elements are moved to the beginning of the next memory block, i.e. the block at level i−1. This is followed by decreasing mi−1 by nj−mi and increasing mj to B. Finally, i is increased by 1 and compaction continues at the next level. Compaction may free the rightmost leaf in the block tree but also create up to t−2 empty memory blocks within the block tree. The final compacted representation is obtained by repeatedly moving the rightmost node to the leftmost free block until all free blocks are occupied. In this representation, all memory blocks are fully utilized except one.

According to another embodiment of the present invention an alternative technique, herein called "virtual blocks" could be employed instead of, or in addition to, the one described above.

Virtual Blocks

If the size b of the memory blocks and the size of keys and data fit extremely bad together nodes and/or leaves will contain many unused bits even if the tree is implicit according to the definition above. This problem is referred to as a quantization effect. To reduce quantization effects, we can use virtual memory blocks with custom sizes bleaf and bnode for leaves and nodes respectively such 100% block utilization is achieved. By choosing bleaf and bnode less than or equal to b, we can be sure that a custom block straddles at most one b-block boundary. As a result, the worst case cost for accessing a custom block is two memory accesses and thus the total cost for lookup is doubled in the worst case.

According to yet another embodiment of the present invention, another technique, herein called "bit push pulling could be employed instead or in any combination. This technique is illustrated in FIG. 3a-d.

Bit Push-Pulling

Another method for reducing quantization effects without increasing the lookup cost is bit push-pulling. Similarly to virtual memory blocks, the idea behind bit push-pulling is to emulate memory blocks with some other size than b in order to increase block utilization. Let nleaf=n (1, w, b, d) and nnode=floor(b/w). In each leaf and node we have bleaf=b−(nleaf·(d+w)−w) and bnode=b−nnode·w unused bits respectively. If bnode=nnode·((w+d)−bleaf), each leaf below a parent node at level 2, except the last leaf, can be extended to b+(w+d)−bleaf bits by storing (w+d)−bleaf bits in the parent node. In this way, the first nnode leaf blocks as well as the node block becomes 100% utilized. The missing bits from the leaves are pushed upwards to the next level during construction and pulled downwards when needed during lookup, hence the name bit push-pulling. One of the leaves is leaved unextended. By doing so, we can apply the technique recursively and achieve 100% block utilization for nnode sub-trees of height 2 by pushing bits to the node at level 3. As the number of levels increases, the block utilization in the whole block tree converges towards 100%.

As an example, we can use bit push-pulling to reduce the worst case storage cost for 112-bit keys with 16-bit data and 256-bit memory blocks. For w=104 we have 100% leaf utilization (2·104+3·16=256) but only 87.5% node utilization. We can therefore suspect that the low cost of 128 bits per interval can be reached for some w>104 by some clever modification of the block tree. Consider such a w and imagine a (t, w)-block tree where leafs and nodes are organized in the same manner as for w=104 and for now ignore how this is achieved as we will come to that later. The total number of utilized bits B(t) in our imaginary block tree is defined by the recurrence equation $$B(1)=2w+3\cdot 16$$

$$B(t)=2w+3B(t-1)$$

and the number of blocks is given by s(t, 104) since the organization of nodes and leafs are the same. By solving the equation B(t)=b·s(t, 104) for w we get $$w=3t\cdot(128-16)-128\ 3t-1=112, \text{ as } t\to\infty.$$

Hence, for w=112, 100% utilization would be achieved and it is therefore meaningless to consider larger values than 112. Let us focus on w=112 and see what can be achieved. FIG. 3(a) shows a leaf containing an interval endpoint, two data fields and an area of the same size as the interval endpoint that is unused (black). If we had some additional bits for representing a third data field, the unused bits could be used to represent a second endpoint. The resulting leaf would be organized in the same way as leafs in (t, 104) block trees. Missing bits are shown using dashed lines in the figure. The unused bits in the node illustrated in FIG. 3(b) correspond to two data fields. Each node has three children and hence three leaves share parent node. We can store the missing data fields from two of the leafs in the unused data fields in the node to obtain a tree of height two which is missing space for one data field as shown in FIG. 3(c). In FIG. 3(d), we have applied the technique recursively to create a tree of height three which is also missing space for one data field. Conceptually, we emulate 256+16=272-bit blocks for storing the leaves and 256−2·16=224-bits blocks for storing the nodes. For this to work when all blocks are of size 256 the bits from the leaves are pushed upwards in the tree during construction and pulled downwards if/when needed during lookup. By using this bit push-pull technique we can implement modified (t, 112)-block trees of arbitrary height with utilization that converges to 100%. The maximum number of intervals and maximum relative size are given by bn (t, 112)=bn (t, 104)=3t and c (t, 112)=c (t, 104)=128.

According to yet another embodiment of the present invention, another technique herein called "virtual blocks" could be employed instead or in combination with the ones already disclosed.

Block Aggregation

The block aggregation technique is simpler and less elegant but can be used together with bit push-pulling for instance. If bnode<nnode·((w+d)−bleaf), we can use block aggregation to construct super leaves and super nodes stored in aleaf·b and anode·b bits blocks respectively. If bleaf and w+d are relatively prime, bleaf can be used as generator and aleaf·bleaf can be used to construct any integer modulo w+d. Otherwise, aleaf=(w+d)/bleaf leaf blocks are combined into one super leaf with 100% utilization. For nodes, the method is similar. If bnode and w are relatively prime, bnode can generate any integer modulo w, 2w, 3w, and so on. In particular, the exact number of unused bits required for bit push-pulling can be generated. Otherwise, anode=w/bnode blocks are combined into a super node with 100% utilization. Bit push-pulling have only positive effect on the lookup performance since the size of the set of intervals we can handle increases without causing additional memory accesses for the lookup. When using block aggregation we can expect a slight increase of the lookup cost since we may have to search large aggregated blocks. However, since an aggregated block can be organized as a miniature block tree and we never need to aggregate more than b blocks, the local lookup cost is ceil (LOG($b^2$/w))+1, where LOG is the logarithm with base floor (b/w). Note that we assume that the last memory access (the added 1) straddles a block boundary. Even in the worst case, this is only marginally more expensive than the lookup cost in a non-implicit block tree where block aggregation is not used.

As an example, we can use block aggregation to improving compression for 128-bit keys with 16-bit data stored in 256-bit memory blocks. The cost for using basic block trees is 192 bits per interval—which would be optimal for d=64 bits data—when w>104 and drops to 128 bits per interval when w=104. It would be possible to implement more efficient block trees for w=128 if we could use larger blocks. If we could use 2·128+3·16=304-bit blocks for the leafs while keeping the 256-bit block for the nodes, the maximum relative size of a 128-bit block tree drops to 144 and the ideal compression ratio (=optimal storage cost) is reached. This can be easily achieved in a hardware implementation where the different levels of the block tree are stored in different memory banks that can have different block sizes. However, if we are stuck with 256-bit blocks the only option is to somehow emulate larger blocks. Assume that two memory accesses can be spent for searching a block tree leaf rather than only one memory access. Two blocks can then be combined into a 512-bit superleaf containing three 128-bit interval endpoints and four 16-bit data fields. Of the total 512 bits, we utilize 3·128+4·16=448 corresponding to 81.25% which is an improvement compared to 62.5%. Using the same technique, 768 bit blocks can be emulated with 95.8% utilization and 1024-bit blocks with 100% utilization (7·128+8·16=1024). In a 1024 bits block, we can store 7 keys $x_1, x_2, \ldots, x_7$, where $x_i<x_{i+1}$, and 8 data fields. Searching a superleaf in four memory accesses is straightforward as there are four blocks. To reduce the search cost to three memory accesses we organize the superleaf (See FIG. 4) as follows: the first block contains $x_3$ and $x_6$, the second block contains $x_1$ and $x_2$, the third block contains $x_4$ and $x_5$, and the fourth block contains $x_7$ and the 8 data fields. By searching the first block in one memory access we can determine in which of the other three blocks to spend the second memory access. The third memory access is always spent in the fourth block. We will refer to this data structure as modified (t, 128)-block tree. The maximum number of intervals that can be stored is bn (t, 128)=3t−3·8 and since both nodes and leafs are 100% utilized, the maximum relative size is the ideal c (t, 128)=w+d=144 bits per interval.

Split Block Trees

Consider a collection of small (t, w)-block trees representing $n_1, n_2, \ldots, n_F$ intervals. If the maximum relative size for the collection as a whole is too high we can reduce the quantization effects by using split block trees. The idea is to store the block tree in two parts called the head and the tail. The head contains the relevant information from all partially used nodes and leaf and a pointer to the tail which contains complete block trees of height 1, height 2, and so on. The tail consists of memory blocks that are fully utilized and a forest of block trees is stored with all the tails, block aligned, in one part of the memory whereas the heads are bit aligned in another part of the memory. For the collection as a whole, at most one memory block is under utilized. There can be at most one partially used node at each level and at most one partially used leaf. By recording the configuration of the head, the partial nodes and leaf can be tightly packed together (at the bit level) and stored in order of descending height. Moreover, the only requirement on alignment of the head is that the tail pointer and the partial level t node lies in the same memory block. We can then search the partial level t node in the first memory access, the partial level t−1 node in the second, and so on. It does not matter if we cross a block boundary when searching the partial t−i level node since we have already accessed the first of the two blocks and only have to pay for the second access. As a result, the cost for reaching the partial t−i node is at most i memory accesses and we have at least t−i memory accesses left to spend for completing the lookup. If n is very small, e.g. the total number of blocks required for storing the head and the tail is less than t, the quantization effects can be reduced even further by skipping the tail pointer and storing the head and the tail together.

Now, a set of techniques for scheduling maintenance work, corresponding to the third step 203 will be described in more detail.

Vertical Segmentation

To handle large block trees, a technique called vertical segmentation could be implemented, where the tree is segmented into an upper part and a lower part. The upper part consists of a single block tree containing up to M intervals and the lower part consists of up to M block trees where each block tree contains up to N intervals. To keep the overall tree structure reasonably balanced, while limiting the update cost for large n, we will allow reconstruction of at most one block in the upper part plus complete reconstruction of two adjacent block trees in the lower half, for each update.

Bucket List Maintenance

Figure 5A:
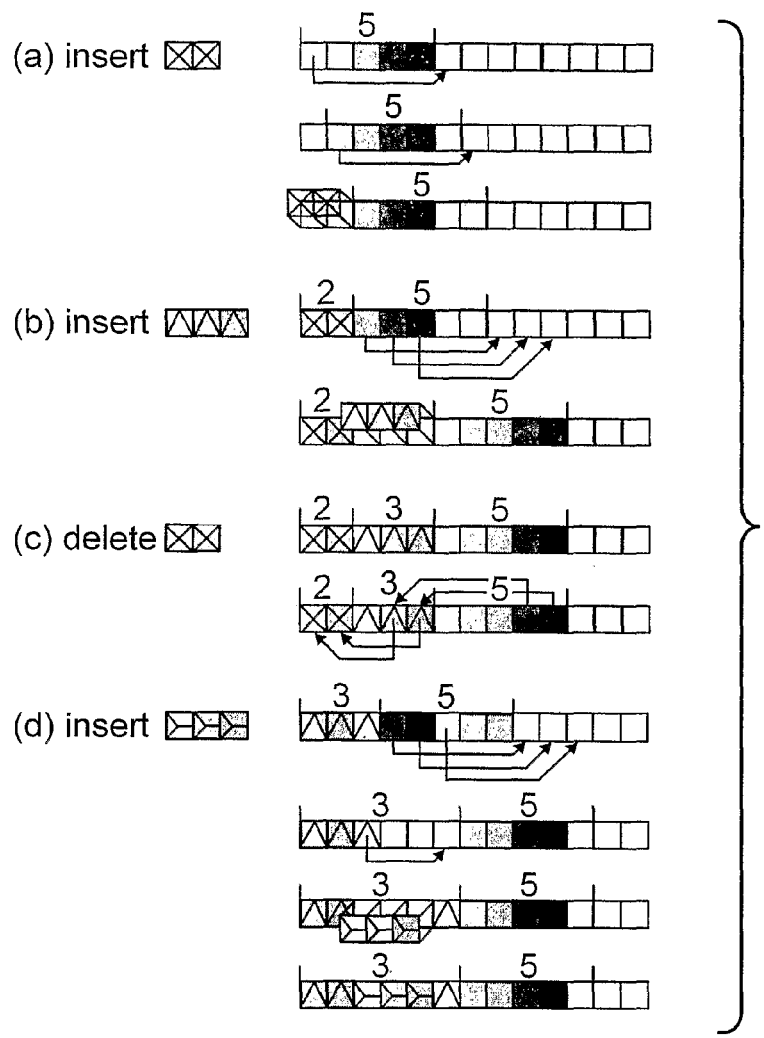
FIG. 5a illustrates stockpiling and 5b the maintenance strategy.
Figure 5B:
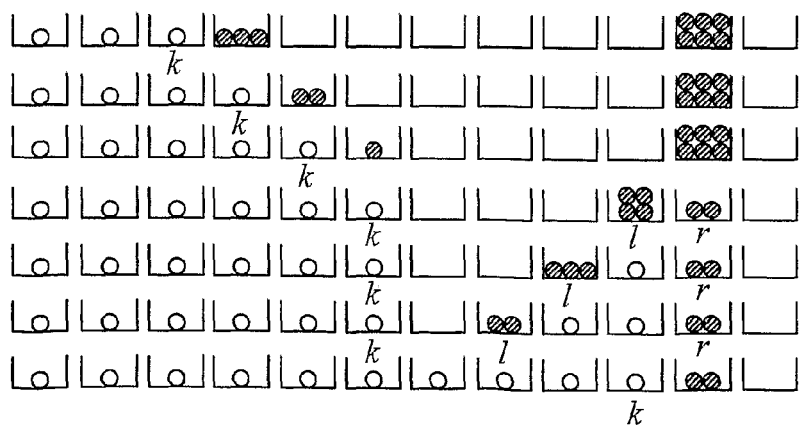

Now is referred to FIG. 5b. Let u(M,N) be our update cost budget, i.e., the maximum number of memory accesses we are allowed to spend on one update. We consider the data structure to be full when additional reconstruction work would be required to accommodate for further growth. The main principle behind our maintenance strategy is to actually spend all these memory accesses on each update in the hope of postponing the first too expensive update as much as possible.

First, let us present the problem in a slightly more abstract form. Let $B_1, B_2, \ldots, B_M$ be a number of buckets corresponding to the M block trees in the lower part. Each bucket can store up to N items corresponding to N intervals. Let $x_i$ be an interval endpoint in the upper tree and $x[i,1], \ldots, x[i, m_i]$ belonging to the interval $[x[i-1], x[i]-1]$ be the interval endpoints in the lower tree corresponding to bucket $B_i$. Clearly, $x_i=x[i]$ works as a separator between bucket $B_i$ and bucket $B[i+1]$. Since we are allowed to reconstruct one block in the upper tree and reconstruct two adjacent trees in the lower part, we can replace $x_i$ in the upper tree by one of $x[i,1], \ldots, x[i, m_i], x[i+1,1], \ldots, x[i+1,m_i+1]$ and build two new block trees from scratch from the remaining interval endpoints. This corresponds to moving an arbitrary number of items between two adjacent buckets. When an item is inserted into a full bucket, it fails and the system of buckets is considered full. Only insertions needs to be considered since each delete operation reduces n by 1 while financing the same amount of reconstruction work as an insert operation. The role of a maintenance strategy is to maximize the number items that can be inserted by delaying the event of insertion into a full bucket as much as possible. We perform insertions in a number of phases, where the current phase ends either when a bucket becomes full or when M items have been inserted, whichever happens first. Consider a phase where m≦M items have been inserted. For each item inserted we can move an arbitrary number of items between two adjacent buckets. This is called a move.

Proposition 10 (a) m−1 moves is sufficient to distribute these m items evenly, i.e. one item per bucket, no matter how they were inserted, (b) these m−1 moves can be performed after the current phase.

Initially, we have 0 items in each bucket or equivalently space for N0=N items. Provided that N≧M, M items will be inserted in the first phase. By Proposition 10, these can be evenly distributed among the buckets, by performing the maintenance after the first phase. When the next phase begins, there will be 1 item per bucket or equivalently space for N1=N0−1=N−1 additional items. This can be repeated until Ni=N−i<M, and the total number of items inserted up to this point is M·(N−M). In phase Ni, the smallest number of elements that can be inserted is M−1 if all items falls in the same bucket and in the remaining phases the number of insertions is reduced by 1 in each phase until only one item can be inserted. According to Proposition 10, maintenance can still be performed but only for a limited number of buckets. If we focus maintenance efforts to the buckets where insertions occur we can still guarantee that the available space does not decrease by more than one item for each phase. Hence, an additional sum(i, i=1 . . . M)=M·(M+1)/2 items can be inserted yielding a total of MN−M·(M−1)/2 items. For each insertion in the current phase we can perform one move (of maintenance work) for the previous phase. The difference in number of inserted items is at most 1 between the previous and the current phase. By Proposition 10 (a), the number of insertions of the current phase is thus sufficient to pay for the maintenance for the previous phase and Proposition 10 (b) follows. It remains to prove Proposition 10 (a). To distinguish between items that have not been maintained from the previous phase and items being inserted in the current phase we color the items from the previous phase blue and the inserted items red. First consider the case when m=M. The maintenance process basically operates on the buckets in a left to right fashion (with an exception). Let Bi be the number of blue items in bucket i, and k the index of the rightmost completed bucket–k is initially zero. We start in rightward mode: Find the leftmost bucket r satisfying sum(Bj, j=k+1 . . . r)≧r−k. If r=k+1, move Br−1 (possibly zero) item from bucket r to bucket r+1 and increase k by 1 since bucket r is completed. Otherwise (r>k+1), set I=r and enter leftward mode. In leftward mode the maintenance process works as follows: If I=k+1, k is increased to r−1 and we immediately enter rightward mode. Otherwise, I−(k+1)−sum(Bj, j=k+1 . . . I−1) items are moved from bucket I to bucket I−1, and I is decreased by 1. FIG. 5b illustrates how completion of three buckets is achieved in three steps in rightward mode followed by completing four buckets in leftward mode in the last four steps. Switching between rightward and leftward mode is free of charge. For each move performed in rightward mode one bucket is completed. In leftward mode there are two cases. If there is only one move before switching to rightward mode, one bucket is completed. Otherwise, no bucket is completed in the first move but this is compensated by completing two buckets in the last. For each move between the first and the last move one bucket is completed. To summarize this, each move completes one bucket and hence there are M−1 buckets that contains exactly 1 blue item each after M−1 moves. There are M blue items in total and hence the last bucket must also contain 1 blue item (and is thus also completed). We have proved Proposition 10 (a) for m=M. If m<M, we can use a left to right greedy algorithm to partition the set of buckets into a minimum number of regions where the number of buckets in each region equals the total number of blue items in that region. Some buckets will not be part of a region but this is expected since less than M blue items are available. Within each region we run the maintenance process in exactly the same way as for m=M. This concludes the proof of Proposition 10 (a) as well as the description and analysis of our maintenance strategy.

Stockpiling

Consider the general problem of allocating and deallocating memory areas of different sizes from a heap while maintaining zero fragmentation. In general, allocating a contiguous memory area of size s blocks is straightforward—we simply let the heap grow by s blocks. Dellocation is however not so straightforward. Typically, we end up with a hole somewhere in the middle of the heap and a substantial reorganization effort is required to fill the hole. An alternative would be to relax the requirement that memory areas need to be contiguous. It will then be easier to create patches for the holes but it will be nearly impossible to use the memory areas for storing data structures etc. We need a memory management algorithm which is something in between these two extremes. The key to achieve this is the following observation: In the block tree lookup, the leftmost block in the block tree is always accessed first followed by accessing one or two additional blocks beyond the first block. It follows that a block tree can be stored in two parts where information for locating the second part and computing the size of the respective parts is available after accessing the first block. A stockling is a managed memory area of s blocks (i.e. b bits blocks) that can be moved and stored in two parts to prevent fragmentation. It is associated with information about its size s, whether or not the area is divided in two parts and the location and size of the respective parts. Moreover, each stockling must be associated with the address to the pointer to the data structure stored in the stockling so it can be updated when the stockling is moved.

Finally, it is associated with a (possibly empty) procedure for encoding the location and size of the second part and the size of the first part in the first block. Let ns be the number of stocklings of size s. These stocklings are stored in, or actually constitutes a, stockpile which is a contiguous sns blocks memory area. A stockpile can be moved one block to the left by moving one block from the left side of the stockpile to the right side of the stockpile (the information stored in the block in the leftmost block is moved to a free block at the right of the rightmost block). Moving a stockpile one block to the right is achieved by moving the rightmost block to the left side of the stockpile. The rightmost stockling in a stockpile is possibly stored in two parts while all other stocklings are contiguous. If it is stored in two parts, the left part of the stockling is stored in the right end of the stockpile and the right end of the stockling at the left end of the stockpile. Assume that we have c different sizes of stocklings s1, s2, . . . , sc where si>si+1. We organize the memory so that the stockpiles are stored in sorted order by increasing size in the growth direction. Furthermore, assume without loss of generality that the growth direction is to the right. Allocating and deallocating a stockling of size si from stockpile i is achieved as follows:

Allocate si.

Repeatedly move each of stockpiles 1, 2, . . . , i−1 one block to the right until all stockpiles to the right of stockpile i have moved si blocks. We now have a free area of si blocks at the right of stockpile i. If the rightmost stockling of stockpile i is stored in one piece, return the free area. Otherwise, move the left part of the rightmost stockling to the end of the free area (without changing the order between the blocks). Then return the contiguous si blocks area beginning where the rightmost stockling began before its leftmost part was moved. Deallocate si.

Locate the rightmost stockling that is stored in one piece (it is either the rightmost stockling itself or the stockling to the left of the rightmost stockling) and move it to the location of the stockling to be deallocated. Then reverse the allocation procedure.

In FIG. 5a, we illustrate the stockpiling technique in the context of insertion and deletion of structures of size 2 and 3 in a managed memory area with stockling sizes 2, 3 and 5. Each structure consists of a number of blocks and these are illustrated by squares with a shade of grey and a symbol. The shade is used to distinguish between blocks within a structure and the symbol is used to distinguish between blocks from different structures. We start with a 5-structure and then in (a) we insert a 2-structure after allocating a 2-stockling. Observe that the 5-structure is stored in two parts with the left part starting at the 6th block and the right part at the 3rd block. In (b) we allocate and insert 3 blocks and as a result, the 5-structure is restored into one piece. A straightforward deletion of the 2-structure is performed in (c) resulting in that both remaining structures are stored in two parts. Finally, in (d) a new 3-structure is inserted. This requires that we first move the 5-structure 3 blocks to the right. Then, the left part (only the white block in this case) of the old 3-structure is moved next to the 5-structure and finally the new 3-structure can be inserted. The cost for allocating an si stockling and inserting a corresponding structure is computed as follows. First, we have to spend $(i-1) \cdot si$ memory accesses for moving the other stockpiles to create the free space at the end of the stockpile. We then have two cases: (i) Insert the data structure directly into the free area. The cost for this is zero memory accesses since we have already accessed the free area when moving the stockpiles (insertion can be done simultaneously while moving the stockpiles). (ii) We need move the leftmost part of the rightmost stockling. However, it occupies an area which will be overwritten when inserting the data structure. Therefore, we get an additional si memory accesses for inserting the data structure. For deallocation, we get an additional cost of si memory accesses since we may need to overwrite the deleted stockling somewhere in the middle of the stockpile. We also need to account for the cost for updating pointers to the data structures that are moved. Since the stockpiles are organized by increasing size, at most one pointer needs to be updated for each stockpile moved plus two extra pointer updates in the current stockpile. It follows that the cost for inserting a si blocks data structure when using stockpile memory management is $isi+(i-1)+2=isi+i+1$ memory accesses and the cost for deletion is $(i+1) \cdot si+(i-1)+2=(i+1) \cdot si+i+1$ memory accesses.

Stockpiling can be used also if it is not possible to store data structures in two parts. In each stockpile, we have a dummy stockling and ensure that it is always the dummy stocklings that are stored in two parts after reorganization.

As an example of how stockpiling is used together with bucket list maintenance and vertical segmentation, we show how to design a dynamic (12, 128)-block tree. To implement the upper part of a vertically segmented (12, 128)-block tree we use a standard (5, 128)-block tree, i.e., without superleafs, with p bits pointers instead of d bits data. For the lower part we choose modified (7, 128)-block trees. The total lookup cost for the resulting data structure is still 12 memory accesses. For this combination, we have N=n(5, 128)=162, M=n(7, 128)=648 and the total number of intervals we can store is 91935.

By using stockpiling we can limit the cost for insertion and deletion of an ai-block structure to at most $iai+i+1$ memory accesses and $(i+1) \cdot ai+i+1$ memory accesses, respectively, where $a1>a2> \ldots >ak$ are the different allocation units available. In our case, the maximum allocation unit is s (7, 128)=364 blocks and assuming that we require maximum compression, we must use 364 different allocation units. As a result, $ai=364-(i-1)$ and the worst-case cost for inserting an al 82=364-(182-1)=183-block structure is 33489 memory accesses. To reduce the memory management overhead we must reduce the number of allocation units. This is achieved by decreasing the compression ratio. When using vertical segmentation, we waste 128 bits in each leaf in the upper part for storing pointers and some additional information that is required when using Stockpiling. By using these bits we can also store the variables k, r, and I required for running the maintenance of each block tree in the lower part in-place. The total cost for this is 162·128=20736 bits which is amortized over 91935 intervals yielding a negligible overhead per interval. Hence, the maximum relative size is roughly 144 bits per intervals also with vertical segmentation. Suppose that we increase storage by a factor of C, for some constant C>1. We can then allocate (and use) 364 blocks even if we only need A blocks, provided that $AC \geq 364$. Furthermore, we can skip all allocation units between A-1 and 364. By applying this repeatedly, we obtain a reduced set of allocation units where $ai=ceil(a1/C^{(i-1)})$. To further demonstrate this, we choose C=2, which corresponds to a 100% size increase, and perform a thorough worst-case analysis of the update cost. The first step is to compute the set of allocation units and the insertion and deletion cost for each allocation unit (see Table 9). Before investigating the worst-case update cost, we observe that 364+730=1094 memory accesses is a lower bound on the update cost which is independent of C. This is a result from simply reconstructing one 364-block structure without involving the memory manager and simultaneously de-allocating the other 364-block structure at a cost of 730 memory accesses. For our particular choice of C, an additional 367 memory accesses for allocating a 182-block structure must be added to the lower bound resulting in an actual lower bound of 1461 memory accesses. In the worst-case, an insertion of one allocation unit and a deletion of another is required for both block trees. However, not all combinations of insertion and deletion costs are possible. The first observation is that deleting of one allocation unit is followed by inserting the next smaller or the next larger allocation unit. We can also exclude the combinations where the size of the deleted allocation unit from one block tree is the same as the inserted allocation unit from the other block tree as this eliminates one deallocation cost. By comparing costs for the remaining combinations in the table above, we find that the worst-case occurs when deleting a 364-block and a 91-block structure and inserting two 182-block structures resulting in a total cost of 730+368+2·367=1832 memory accesses. Adding the single memory access required for updating the upper part yields a total worst-case incremental update cost of 1833 memory accesses for a 100% size increase. To provide a better understanding of the possible trade-offs between compression ratio and guaranteed update costs we have performed these computations for various values of C and the result are presented in Table 10. These figures should be compared with 134322 memory accesses which is the update cost obtained for C=1. Also note that for $C \geqq 3.31$, the worst-case update cost equals the general lower bound computed above plus the cost for allocating an a2-blocks structure.

TABLE 9

Insertion and deletion costs for the different allocation units obtained for C = 2.

| i | 1 | 2 | 3 | 4 | 5 | 6 | 7 | 8 | 9 | 10 |
|---|---|---|---|---|---|---|---|---|---|---|
| $a_i$ | 364 | 182 | 91 | 46 | 23 | 12 | 6 | 3 | 2 | 1 |
| $icost_i$ | 366 | 367 | 277 | 189 | 121 | 79 | 50 | 38 | 28 | 21 |
| $dcost_i$ | 730 | 549 | 368 | 235 | 144 | 91 | 56 | 36 | 30 | 22 |

TABLE 10

Relation between storage and update costs.

| C | Worst-case update cost |
|---|---|
| 1.1 | 6537 |
| 1.25 | 3349 |
| 1.5 | 2361 |
| 1.75 | 2049 |
| 2 | 1833 |
| 2.5 | 1561 |
| 3 | 1393 |
| 4 | 1280 |

Throughout this application (including claims) we will use the terms "routing table", "partition of intervals", and "set of intervals" interchangeably to mean the input data from which the classification data structure is built.

Embodiments of the present invention will now be described with reference to FIGS. 1a, and 2 (and FIG. 6), of which FIG. 2 illustrates the method steps and FIG. 6 illustrates a classifier device according to an embodiment of the invention configured in hardware.

Now is referred to FIG. 2. In a first step 201, a datagram forwarding data structure 100 is provided in a storage (not shown). The data forwarding structure is provided for indicating where to forward a datagram in said network. The data forwarding structure 100 comprises a comparison based implicit tree structure 10 comprising at least one leaf and possibly a number of nodes. Herein, the tree structure comprises (t, w)-block trees, of which each could have the configuration as illustrated and described with reference to FIG. 1a. In a second step 202, a fixed stride trie structure, in which the leafs comprise a forest of implicit tree structures is provided. In a third step, 203 both of these structures are combined to form the data forwarding hybrid data structure 10 as illustrated in FIG. 3b. (t, w)-block trees are illustrated as triangles with (t, w) and k-stride trie nodes are shown as rectangles and labelled with k.

In another embodiment of the present invention a fixed stride trie is used where the total height, or number of levels, is bounded by a lookup cost budget, step 204.

In another embodiment of the present invention, the current number of elements in the sub-universe, called the density, is taken into account, such that if the sub-universe is dense, a new stride is used recursively, or otherwise, i.e. if the universe is sparse, a data structure called block tree is used, step 205.

In another embodiment of the present invention, the stride trie(s) is/are configured in advance. to achieve minimum worst case storage cost for any set of intervals for a given lookup cost budget, or to achieve minimum worst case storage cost for any set of at least a specified minimum number of intervals and for a given lookup cost budget, step 206.

In another embodiment of the present invention, the hybrid data structure is configured in advance for a certain maximum number of intervals, step 207.

All these method steps related to different embodiments of the present invention will be still further described below, but first is referred to FIG. 6, which is an illustration of a block schematic of a classifier device 100 for performing the method, according to an embodiment of the present invention. The classifier device 100 is implemented in hard-ware and could be referred to as a classifier. The hard-ware implemented device 100 comprises an input/output unit 104 for transmission of data signals comprising datagrams to or from a source or destination such as a router or the like (not shown). This input/output unit 104 could be of any conventional type including a cordless gate way/switch having input/output elements for receiving and transmitting video, audio and data signals. Data input is schematically illustrated as "query" of one or more data header field(s), and data output as a result such as forwarding direction, policy to apply or the like. Arranged to communicate with this input/output unit 104 there is provided a system bus 106 connected to a control system 108 for instance including a custom classification accelerator chip arranged to process the data signals. The chip provides, or includes, means for providing a fixed or k-stride stride trie structure, in which the leafs comprise a forest of implicit tree structures, and means 109 for combining said comparison based implicit tree structure and said trie structure to a hybrid structure.

Typically, the chip 108 could be configured as comprising classifier lookup structure and classifier lookup, typically hardwired.

In an alternative embodiment of the present invention, the classifier device 100 is implemented in software instead. To ease understanding, same reference numerals as already have been used in relation to FIG. 6 will be used as far as possible.

Typically, the control system 108 comprises a processor 111 connected to a fast computer memory 112 with a system bus 106, in which memory 112 reside computer-executable instructions 116 for execution; the processor 111 being operative to execute the computer-executable instructions 116 to:

providing in a storage 102, herein typically the main-memory, a datagram forwarding data structure provided for indicating where to forward a datagram in said network, which data structure is in the form of a block tree, or fixed stride trie, comprising at least one leaf and possibly a number of nodes including partial nodes, said data structure having a height, corresponding to a number of memory accesses required for lookup in an arbitrary partition comprising n intervals;

providing a fixed or k-stride stride trie structure, in which the leafs comprise a forest of implicit tree structures step 202, combining said comparison based implicit tree structure and said stride trie structure to a hybrid structure, step 203.

Herein, according to an embodiment of the present invention, as illustrated in FIG. 3b, each block tree 10 is a static B-tree designed to exploit locality of memory references by storing the maximum possible number of keys in each memory block to maximize the degree of the block tree nodes and minimize the depth. As the keys are further reduced in size, as a result of using strides, the degree of the block tree nodes increases accordingly.

Block trees are used because they have a number of favourable properties such as:

- Optimal worst-case lookup cost in terms of number of memory blocks accessed if operations on keys are limited to comparisons.
- Optimal worst-case storage cost in terms of total number of memory blocks used with respect to the number of keys.
- Lookup costs and storage costs are always predictable and independent on the distribution of keys. No pathological cases are possible.
- The actual work performed for each memory access is logarithmic in the number of keys stored in the memory block.
- By sacrificing a small amount of storage, i.e. accepting a small increase of the storage cost, reasonably efficient incremental updates can be implemented as well.
- Block trees are straight forward to implement in hardware using pipelining.

To achieve a bounded lookup cost, according to an embodiment of the present invention, there is provided a fixed stride trie where the total height, or number of levels, is bounded by a lookup cost budget. By using a stride we effectively partition the universe into sub-universes where the keys can be represented using fewer bits according to the stride. For each sub-universe, a data structure is constructed recursively while keeping in mind that the lookup cost budget is one memory access less than for the parent universe. When deciding which data structure to build, the current number of elements in the sub-universe, called the density, is taken into account. If the sub-universe is dense, a new stride is used recursively. Otherwise, i.e. if the universe is sparse, a data structure called block tree is used.

By carefully choosing the size of strides k and block trees 10, and a careful elaborate implementation of block trees, the results presented in Table 1 could be obtained for a standard computer with b=256-bit memory blocks. The first column shows the key size w, the second column the worst-case lookup cost and the last column the worst-case storage cost c.

TABLE 1

Worst case lookup and storage cost for b = 256 bits memory blocks and various w.

| w (bits) | t (memory accesses) | c (bits/interval) |
|---|---|---|
| 8 | 2 | 7.992654 |
| 16 | 3 | 15.996743 |
| 32 | 4 | 31.995123 |
| 64 | 7 | 63.999181 |
| 128 | 12 | 128.440519 |
| 256 | 23 | 258.062410 |

It follows that full 128-bit IPv6 classification can be performed in only 12 memory accesses, returning an index to the data, independently of the input size n. Our hybrid data structure uses only marginally more than 128 bits/interval of storage in the worst case. If 64-bit matching is sufficient, the worst case lookup cost is reduced to only 7 memory accesses and the corresponding storage cost is reduced to less than 64 bits per interval.

The present invention (e.g. hybrid technique) is by no means limited to k_t-k_(t-1)- ... -k_1 fixed stride tries. It can be used together with any kind och multi-bit trie including level compressed tries (LC-tries–, variable stride tries, path compressed tries and arbitrary variations thereof to allow for an increase of the degree of the trie nodes to reduce the depth (=worst case lookup cost) without causing a blow-up of the worst case storage cost.

Fixed Stride Tries

The fixed stride trie is a generalization of the k-stride trie obtained by using different strides at different levels. A t level fixed stride trie with stride sequence k1, k2, ..., kt is referred to as k1-k2- ... -kt fixed stride trie.

Figure 6B:
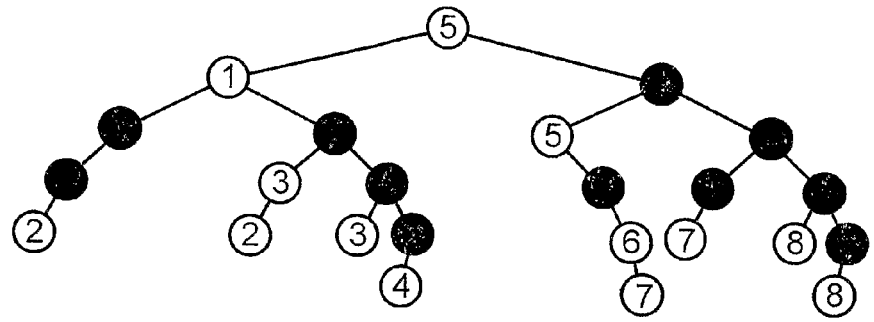
FIG. 6b illustrates the construction of a 3-2 fixed stride trie from the example binary trie.
Figure 6B:
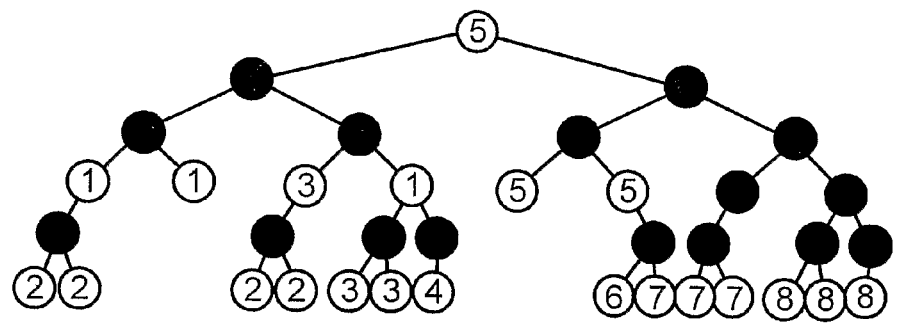
Figure 6B:
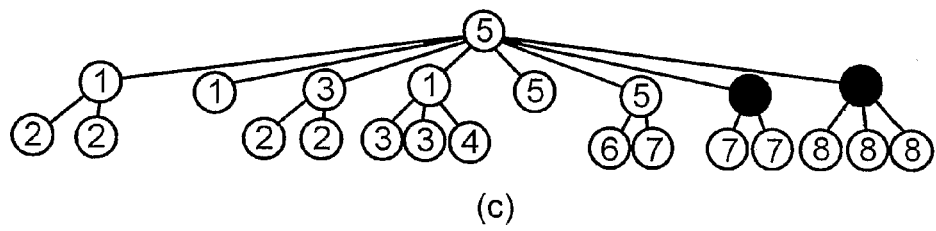

In FIG. 6b, we illustrate the construction of a 3-2 fixed stride trie from the example binary trie. To obtain a 3-stride, a more aggressive prefix expansion is required FIG. 6(a) resulting in two consecutive levels exclusively consisting of black nodes 6(b). The final two level data structure is shown in FIG. 6(c).

To get a better understanding of the advantages of using different strides at different levels, let us compare a t-level w/t-stride trie with a t-level fixed stride trie from different points of view. Clearly, the worst case lookup cost is t in both cases. However, if we design the fixed stride trie for a scenario where n≥nmin, for some (large) nmin, and we do not care about the size (per prefix) for smaller n, we can use a dig nmine-stride at the first level.

In practice, a large portion of the lookups will then be completed in one memory access, thus decreasing the average lookup cost. We can apply this line of reasoning recursively and arrive at the conclusion that stride sequences should be monotonically decreasing for best average lookup performance. Not surprisingly, most fixed stride tries found in the literature have monotonically decreasing, or even strictly decreasing, stride sequences. It is tempting to draw the conclusion that such a stride sequence also results in the smallest size but this is not necessarily true.

When talking about fixed stride tries, it is important to distinguish between tries that are configured before the routing table is known and tries that are (optimally) configured afterwards for a given routing table. This could be provided by means of a dynamic programming technique for constructing a space optimal t-level fixed stride trie with from a given routing table, which is known per se.

This approach may work just fine for a software implementation where all levels reside in the same memory. However, for a high performance hardware implementation we can expect a pipelined lookup where each level resides in a separate memory bank. These memory banks must be configured in the design of the chip, i.e. it is decided how large each memory bank is, and cannot be changed to accommodate a certain routing table. In fact, the data structure must be configured in advance with a worst case routing table in mind. In addition to the optimization procedure for fixed stride tries, it is also possible to use a variable stride trie, where nodes at the same level may have different strides, together with a corresponding optimization procedure. This could be implemented by introducing a variant of the variable stride trie, called level compressed trie (or LC trie for short) where variable strides are combined with path compression.

From now on, we focus entirely on data structures that are configured in advance.

For a fixed stride trie configured for a certain number of prefixes n, the goal is to minimize the worst case storage requirement for that particular n. That is, to minimize the storage requirements for a pathological set of n prefixes.

As an example, let us suppose that $n=2^{16}$ and $w=32$ and consider a number of different 4-level fixed stride tries. We begin with a 16-8-4-4 fixed stride trie. The first level consists of $2^{16}$ pointers and, in the worst case, there is one 32-bit prefix per pointer. For each such prefix, there will be a private path consisting of an 8-stride and two 4-strides—a total of $2^8+2 \cdot 2^4=288$ pointers. The worst case total number of pointers for the 16-8-4-4 variable stride trie is then $2^{16}+2^{16} \cdot 288=18939904$.

The dominating cost for the 16-8-4-4 fixed stride trie comes from the 288 pointers in each private path. There are two possible ways of reducing this cost: shorten the private path and/or reduce the width of the private path. Minimizing the width of a private path of a given length w0 bits and t0 levels is the same problem as constructing a space optimal t0-level variable stride for storing one single w0-bit prefix. It can be shown that the best solution to this problem is to use a w0/t0-stride trie. In fact, this idea can be combined with shortening of the private paths to obtain an even better stride sequence. Let k be the stride of the first level. The second, third, and fourth levels then consists of (16−k)/3-strides. To compute the optimal choice of k, the storage cost s(k) is expressed as a function of k followed by differentiating s(k) with respect to k to achieve s'(k) and finally solving the equation s'(k)=0.

In this particular example, we find that k=20 is the best choice and the resulting data structure is a is a 20-4-4-4 fixed stride trie consisting of at most 4194304 pointers in the worst case. This concludes the discussion about fixed stride tries.

Experiences from manually computing stride sequences have shown that the strides cannot be computed independently if we want to be sure to find the best configuration. We may ultimately have to test all possible configurations. This is an exhaustive search of considerable combinatorial complexity.

To handle this, we have implemented an automated tool called Strider that performs the exhaustive search. By using high level pseudo code, we can express the behaviour as follows:

```
strider (t, w, b, d, p) =
    For all k₁, k₂ ..., kₜ ≧ 0 such that Σᵢ₌₁ᵗ kᵢ ≦ w
        compute the maximum relative size c
        if c < c_opt then
            c_opt ← c
            K_opt ← [k₁, ..., kₜ]
        end
```

The function strider takes five arguments t, w, b, d, and p and the result is available in two global variables copt and Kopt when it is completed. Except for p which is the number of bits required to represent a pointer in a stride, the arguments are previously introduced. The global variables copt and Kopt contain the projected maximum relative size and the best configuration of strides respectively. Note that the resulting maximum relative size copt must be interpreted as projected maximum relative size since we use approximations of maximum relative size for block trees throughout the procedure. For example, we do not take into account quantization effects where the density is low and only a few bits of a b-bit block are utilized for representing a single interval. However, for all configurations of interest (and in this particular context) quantization effects can be completely eliminated by using the techniques previously described.

It can take a long time for Strider to find the best configuration as it basically performs an exhaustive search. However, it is important to note that is a one-time task carried out only during the design process and not at all when using the data structure. When the best configuration has been found, it is used to configure the data structure to the specific scenario during the implementation process. We have chosen to use strides and block trees as algorithmic building blocks in our current framework. It is, however, possible to let Strider use other building blocks as well.

Herein, the term "routing table" is referred to as a mapping from a set of IP-address prefixes, or simply address prefixes, to a set of next-hop indices. Routing tables are used to determine where to forward a datagram, typically an IP-datagram with a given destination address and retrieve the associated next-hop index representing what to do with the packet. The process of performing the longest match and retrieving the next-hop index is referred to as "routing lookup".

By means of the invention, the data structure is possible to implement using a standard programming language such as C and run on a standard computer. To simplify the integration of such a data structure in a larger system it is also possible to have guaranteed performance. In particular, the invention provides a data structure with guaranteed worst case lookup cost, update cost and storage cost.

The present invention has been described by given examples and embodiments not intended to limit the invention to those. A person skilled in the art recognizes that the attached set of claims sets forth other advantage embodiments.

Definitions of Terms Used in this Document

| | |
|---|---|
| Search | Lookup of a query key in a data structure and retrieval of the associated data if the query key is present. If the key is not present the lookup fails and NULL is returned. |
| Extended search | Lookup of a query key in a data structure and retrieval of the data associated with the largest key smaller than or equal to the query key present in the data structure. If the data structure is empty the lookup fails and NULL is returned. |
| Single field classification | Extended search applied to the problem of matching one header field in an Internet datagram. |
| 1-dimensional packet classification | See Single field classification. |
| Packet classification | The problem of representing a list of D-dimensional rules where each dimension corresponds to a header field represented by an interval and supporting lookup of the first matching rule associated with a datagram. By matching rule, we mean a rule where all header fields in the datagram lies within the corresponding interval in the rule. |
| Multi-field classification | See Packet classification. |
| Static data structure | A data structure is static if updates are accomplished by complete reconstruction, i.e. by building a new data structure from scratch. |
| Dynamic data structure | A data structure is dynamic is updates are accomplished by partial reconstruction, which is typically faster than complete reconstruction. |
| Fixed stride trie | Data structure for representing w-bit keys in t levels where level i consist of nodes represented by arrays of pointers of size $2^{k[i]}$ (2 to the power of k[i]). Each pointer either refers directly to a piece of data if there is only one matching key or a node at the next (lower) level. We number the levels from t, t − 1, . . . ,1 where t is the topmost level. At the topmost level, the k[i] most significant bits of the query key are used to index into the array of pointers. If the pointer retrieved refers to a sub-trie, the w − k[t] least significant bits of the query key are used recursively to complete the lookup. Fixed stride tries support extended search. |

LIST OF ABBREVIATIONS USED IN THIS SPECIFICATION

| | |
|---|---|
| BBT | Basic block tree |
| SBT | Static block tree |
| FST | Fixed stride trie |
| SHT | Static hybrid tree |
| SHBT | Static hybrid block tree |
| SP | Stockpiling |
| DBT | Dynamic block tree |
| DHBT | Dynamic hybrid block tree |
| DHT | Dynamic hybrid tree |
| ASC | Address space compression |

The present invention has been described by given examples and embodiments not intended to limit the invention to those. A person skilled in the art recognizes that the attached set of claims sets forth other advantage embodiments.

The invention claimed is:

1. A method for representing a partition of n w-bit intervals associated to d-bit data in a data communications network, said method comprising the steps of:
providing in a memory storage device, a datagram forwarding data structure provided for indicating where to forward a datagram in said network, which data structure is a combination of a static block tree (SBT), and a fixed stride trie (FST) to obtain a static hybrid tree, comprising combining the SBT and FST according to a framework that involves algorithm analysis, and storing keys and associated data in the static hybrid tree,
reducing worst storage cost by using a technique for reduction of worst case storage cost that are selectable from: partial block tree compaction, virtual blocks, bit push pulling, block aggregation or split block trees, and variations thereof, wherein the technique for reduction of worst case storage cost comprises sub-steps of: performing compaction at each level, starting at level t, and completing the same when the partial node at level 1 has been compacted, wherein mi is the number of additional elements that can be stored in the partially utilized block at level i and j the level of the next partial node to be compacted, wherein initially, before compaction begins, mi=B−ni for all i=1 . . . t and j=t−1, wherein compaction at level i is performed by repeatedly moving the next partial node to the current memory block, wherein this is repeated as long as nj<=mi, wherein for each node moved, mi is decreased by nj followed by decreasing j by 1, wherein mj has to be decreased to B before decreasing j since moving the node at level j effectively frees the whole block at level j, wherein if mi>0 when compaction halts, some space is available, in the current block, for some of the elements from the next partial node but not for the whole node, wherein the first mi elements from the next partial node are moved to the current memory block, which becomes full, and the last nj−mi elements are moved to the beginning of the next memory block, i.e. the block at level i−1, followed by decreasing mi−1 by nj−mi and increasing mj to B, wherein i is increased by 1 and compaction continues at the next level, wherein the final compacted representation is obtained by repeatedly moving the rightmost node to the leftmost free block until all free blocks are occupied; and
updating the layered data structure partially by using a technique for scheduling maintenance work that are selectable from: vertical segmentation and bucket list maintenance.

2. The method according to claim 1, wherein the technique for reduction of worst case storage cost comprises partial block tree compaction, the latter including one or more of the sub-steps of:
storing multiple partial nodes in the same memory block,
storing partial nodes across two memory blocks,
moving partial nodes to under utilized memory blocks higher up in the tree.

3. The method according to claim 2, comprising the step of providing virtual memory blocks with custom sizes bleaf and bnode for leaves and nodes respectively such that 100% block utilization is achieved.

4. The method according to claim 1, comprising the step of emulating memory blocks with some other size than b in order to increase block utilization, wherein nleaf=n (1, w, b, d) and nnode=floor(b/w), in each leaf and node bleaf=b−(nleaf·(d+w)−w) and bnode=b−nnode·w unused bits respectively. If bnode=nnode·((w+d)−bleaf), each leaf below a parent node at level 2, except the last leaf, can be extended to b+(w+d)−bleaf bits by storing (w+d)−bleaf bits in the parent node.

5. The method according to claim 1, comprising the step of spending all memory accesses, up to the worst case update cost budget, on each update to achieve preventive service of the data structure and thus postpone the first too expensive update as much as possible.

6. The method according to claim 1, wherein longest prefix matching (i.e. routing lookup) is reduced to most narrow interval matching, and most narrow interval matching is reduced to first interval matching.

7. The method according to claim 1, comprising the step of amortization of cost.

8. A computer program product directly loadable into the internal memory of a digital computer, characterized in that said product comprises software code means for performing the step of claim 1.

9. A computer program product comprising a computer readable medium, characterized in that, on said medium it is stored computer program code means, when it is loaded on a computer, to make the computer performing the steps of claim 1.

10. The method according to claim 1, said method comprising the steps of:
providing a fixed or k-stride stride trie structure, in which the leafs comprise a forest of implicit tree structures,
combining said comparison based implicit tree structure and said stride trie structure to a hybrid structure.

11. The method according to claim 10, wherein a fixed stride trie is used where the total height, or number of levels, is bounded by a lookup cost budget.

12. The method according to claim 11, wherein a k-stride trie is used.

13. The method according to claim 11, wherein a fixed stride trie structure is used.

14. The method according to claim 11, wherein the current number of elements in the sub-universe, called the density, is taken into account, such that if the sub-universe is dense, a new stride is used recursively, or otherwise, i.e. if the universe is sparse, a data structure called block tree is used.

15. The method according to claim 11, wherein said stride trie(s) is/are configured in advance, to achieve minimum worst case storage cost for any set of intervals for a given lookup cost budget.

16. The method according to claim 11, wherein said hybrid data structure is configured in advance for a certain maximum number of intervals.

17. A classifier device for representing a partition of n w-bit intervals associated to d-bit data in a data communications network in a data communications network, which device comprises:
   a storage for storing a datagram forwarding data structure provided for indicating where to forward a datagram in a network, which data structure is a combination of a static block tree (SBT) and fixed stried trie (FST) to obtain a static hybrid tree, comprising the SBT and FST according to a framework that involves algorithm analysis, and storing keys and associated data in the static hybrid tree;
   means for reducing worst storage cost by using a technique for reduction of worst case storage cost that are selectable from: partial block tree compaction, virtual blocks, bit push pulling, block aggregation or split block trees, and variations thereof, and
   means for updating the layered data structure partially including by using a technique for scheduling maintenance work that are selectable from: vertical segmentation and bucket list maintenance,
   wherein the technique for reduction of worst case storage cost comprises sub-steps of: performing compaction at each level, starting at level t, and completing the same when the partial node at level 1 has been compacted, wherein mi is the number of additional elements that can be stored in the partially utilized block at level i and j the level of the next partial node to be compacted, wherein initially, before compaction begins, mi=B−ni for all i=1 . . . t and j=t−1, wherein compaction at level i is performed by repeatedly moving the next partial node to the current memory block, wherein this is repeated as long as nj<=mi, wherein for each node moved, mi is decreased by ni followed by decreasing j by 1, wherein mj has to be decreased to B before decreasing j since moving the node at level j effectively frees the whole block at level j, wherein if mi>0 when compaction halts, some space is available, in the current block, for some of the elements from the next partial node but not for the whole node, wherein the first mi elements from the next partial node are moved to the current memory block, which becomes full, and the last nj−mi elements are moved to the beginning of the next memory block, i.e. the block at level i−1, followed by decreasing mi−1 by nj−mi and increasing mj to B, wherein i is increased by 1 and compaction continues at the next level, wherein the final compacted representation is obtained by repeatedly moving the rightmost node to the leftmost free block until all free blocks are occupied.

18. A classifier device according to claim 17, wherein the means for reducing worst storage cost by using a technique for reduction of worst case storage cost that are selectable from: partial block tree compaction, virtual blocks, bit push pulling, block aggregation or split block trees, and variations thereof, and the means for updating the layered data structure partially including by using a technique for scheduling maintenance work that are selectable from: vertical segmentation and bucket list maintenance are implemented in a classification chip comprising classifier lookup structure.

19. A classifier device according to claim 18 comprising a main memory connected to the classification chip comprising classifier support structure and program.

20. A system comprising two or more classifier devices according to claim 17.

21. A classifier device for representing a partition of n w-bit intervals associated to d-bit data in a data communications network in a data communications network, which device comprises:
   a storage for storing a datagram forwarding data structure provided for indicating where to forward a datagram in a network, which data structure comprises a combination of a static block tree (SBT) and fixed stride trie (FST) to obtain a static hybrid tree structure, comprising combining the SBT and FST according to a framework that involves algorithm analysis, and storing keys and associated data in the static hybrid tree; and
   a means for combining said comparison based implicit tree structure and said trie structure to the static hybrid tree structure, wherein the framework includes a technique for reduction of worst case storage cost that includes: performing compaction at each level, starting at level t, and completing the same when the partial node at level 1 has been compacted, wherein mi is the number of additional elements that can be stored in the partially utilized block at level i and j the level of the next partial node to be compacted, wherein initially, before compaction begins, mi=B−ni for all i=1 . . . t and j=t−1, wherein compaction at level i is performed by repeatedly moving the next partial node to the current memory block, wherein this is repeated as long as nj<=mi, wherein for each node moved, mi is decreased by nj followed by decreasing j by 1, wherein mi has to be decreased to B before decreasing j since moving the node at level j effectively frees the whole block at level j, wherein if mi>0 when compaction halts, some space is available, in the current block, for some of the elements from the next partial node but not for the whole node, wherein the first mi elements from the next partial node are moved to the current memory block, which becomes full, and the last nj−mi elements are moved to the beginning of the next memory block, i.e. the block at level i−1, followed by decreasing mi−1 by nj−mi and increasing mj to B, wherein i is increased by 1 and compaction continues at the next level, wherein the final compacted representation is obtained by repeatedly moving the rightmost node to the leftmost free block until all free blocks are occupied.

22. A classifier device according to claim 21, wherein the means for combining said comparison based implicit tree structure and said trie structure to a hybrid structure is implemented in a classification chip comprising classifier lookup structure.

* * * * *

UNITED STATES PATENT AND TRADEMARK OFFICE
CERTIFICATE OF CORRECTION

PATENT NO. : 8,364,803 B2 Page 1 of 1
APPLICATION NO. : 12/446318
DATED : January 29, 2013
INVENTOR(S) : Mikael Sundström It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 350 days.

Signed and Sealed this
First Day of September, 2015

Michelle K. Lee
*Director of the United States Patent and Trademark Office*